(12) United States Patent
Botts

(10) Patent No.: US 9,249,653 B1
(45) Date of Patent: Feb. 2, 2016

(54) SEPARATOR DEVICE

(71) Applicant: Troy Botts, Snyder, TX (US)

(72) Inventor: Troy Botts, Snyder, TX (US)

(*) Notice: Subject to any disclaimer, the term of this patent is extended or adjusted under 35 U.S.C. 154(b) by 0 days.

(21) Appl. No.: 14/825,696

(22) Filed: Aug. 13, 2015

Related U.S. Application Data

(60) Provisional application No. 62/047,397, filed on Sep. 8, 2014.

(51) Int. Cl.
*E21B 43/38* (2006.01)
*E21B 27/04* (2006.01)
*B01D 19/00* (2006.01)
*B01D 21/26* (2006.01)

(52) U.S. Cl.
CPC ............ *E21B 43/38* (2013.01); *B01D 19/0057* (2013.01); *B01D 21/265* (2013.01)

(58) Field of Classification Search
CPC ....... E21B 43/38; E21B 43/121; E21B 27/04; E21B 43/34; E21B 21/06
See application file for complete search history.

(56) References Cited

U.S. PATENT DOCUMENTS

| | | | |
|---|---|---|---|
| 1,863,111 A | 6/1932 | Greve | |
| 2,010,947 A * | 8/1935 | Dunlap | 166/149 |
| 2,757,582 A | 4/1954 | Freeman et al. | |
| 3,285,186 A * | 11/1966 | Tracy et al. | 96/215 |
| 4,072,481 A * | 2/1978 | Laval, Jr. | 96/182 |
| 4,666,476 A | 5/1987 | Reeve et al. | |
| 4,900,433 A * | 2/1990 | Dean et al. | 210/170.11 |
| 5,261,791 A * | 11/1993 | Goguen | 417/2 |
| 5,295,537 A * | 3/1994 | Trainer | 166/105.1 |
| 5,309,998 A * | 5/1994 | Rivas et al. | 166/265 |
| 5,431,228 A | 7/1995 | Weingarten et al. | |
| 5,474,601 A * | 12/1995 | Choi | 96/182 |
| 5,525,146 A | 6/1996 | Straub | |
| 5,531,811 A | 7/1996 | Kloberdanz | |
| 5,553,669 A * | 9/1996 | Trainer | 166/105.1 |
| 5,861,052 A | 1/1999 | Meinander | |
| 6,036,749 A | 3/2000 | Ribeiro et al. | |
| 6,039,116 A | 3/2000 | Stevenson et al. | |
| 6,382,317 B1 * | 5/2002 | Cobb | 166/265 |
| 6,394,183 B1 * | 5/2002 | Schrenkel et al. | 166/265 |
| 6,494,258 B1 | 12/2002 | Weingarten | |
| 6,723,158 B2 | 4/2004 | Brown et al. | |
| 6,860,921 B2 | 3/2005 | Hopper | |
| 7,543,633 B2 | 6/2009 | Brown et al. | |
| 8,136,600 B2 | 3/2012 | Fowler et al. | |
| 8,651,184 B2 | 2/2014 | Raglin | |
| 9,045,980 B1 | 6/2015 | Botts | |
| 2003/0079882 A1 | 5/2003 | Mack et al. | |
| 2003/0145990 A1 | 8/2003 | Longacre | |
| 2003/0196952 A1 * | 10/2003 | Kampfen | 210/512.3 |
| 2005/0241826 A1 | 11/2005 | Pratt | |
| 2009/0065202 A1 * | 3/2009 | Brown et al. | 166/267 |
| 2011/0048696 A1 * | 3/2011 | Holte | 166/105.5 |
| 2013/0032341 A1 | 2/2013 | Raglin | |

* cited by examiner

*Primary Examiner* — Blake Michener
*Assistant Examiner* — Kipp Wallace
(74) *Attorney, Agent, or Firm* — Sarah Hegl Simpson; McWhorter, Cobb & Johnson, LLP

(57) ABSTRACT

The disclosed downhole gas and solids separator employs centrifugal force for the downhole separation of gases and solids from a hydrocarbon production stream. The separator device generally includes an outer tube and an inner tube disposed within the outer tube. The disclosed separator further includes a flighting member disposed within the inner tube. The flighting member includes an inside diameter space that defines a cylindrical void space extending through the center portion of the flighting member. The disclosed separator also includes an outer annular space inside the outer tube. The outer annular space defines an annular void space between the exterior surface of the inner tube and the interior surface of the outer tube.

19 Claims, 9 Drawing Sheets

SEPARATOR DEVICE

CROSS-REFERENCE TO RELATED APPLICATIONS

This application is related to and claims priority from earlier filed U.S. Provisional Patent Application No. 62/047,397, filed Sep. 8, 2014, the disclosure of which is incorporated herein by reference.

BACKGROUND OF THE INVENTION

1. Field of the Invention

The present invention relates generally to a downhole gas and solids separator. More specifically, the present invention relates to a device which employs centrifugal force for the downhole separation of gas and solids from a hydrocarbon production stream.

2. Description of Related Art

Artificial lift systems, such as sucker rod pumping systems and progressing cavity pumping systems, are an artificial means employed to increase the flow of fluids (e.g., hydrocarbons) from a production well. Artificial lift is needed in wells when there is insufficient pressure in the reservoir to lift the produced fluids to the surface. Additionally, artificial lift is often used in naturally flowing wells to increase the flow rate above the natural flow rate.

Artificial lift systems often require the attachment of a gas separator at the pump intake. In many wells that produce hydrocarbons, the production stream can include both liquid and gaseous products that are a natural byproduct of the producing well. As hydrocarbons and water flow through the formation, gases can travel in the production stream either separate from the liquid products or entrained within the liquid products. The gas entrained within the liquid products is carried into the production tubing and can damage artificial lift systems and reduce the volumetric efficiency of the pump. The function of a gas separator is to remove as much of the gas as possible from the liquid products coming from the reservoir. Avoiding the entrance of gas is a key factor in maintaining optimum pump efficiency and extending the life of artificial lift systems.

Additionally, artificial lift systems often require the use of a solids or sand separator. In many wells that produce hydrocarbons, the production stream further includes manmade or natural solid products. The most common manmade solid found at the wellhead is proppant or fracture sand, which is increasingly being used as more and more wells are being hydraulically fractured to increase production of wells. Additionally, the production stream may include solids (e.g., sand, silt, etc.) that are a natural byproduct of the producing well. As hydrocarbons and water flow through the formation, these solid products are carried in the production stream and can cause problems with the artificial lift system, such as reducing the life of the lift system and increasing maintenance costs.

Currently, many different separator devices are available for separating gaseous products or solid products from produced fluids. Design problems in current devices, however, present several disadvantages that are overcome by the present invention.

Most current devices are either gas separators or solid separators. Such separators are unable to simultaneously separate both gases and solids from the production stream. Current devices that claim to separate both gases and solids from produced fluids comprise multiple sections or phases—one section or phase for separating solid products and another section or phase for separating gaseous products from the produced fluids. Therefore, such devices inefficiently separate gases and solids in separate phases, rather than simultaneously separating gases and solids from produced fluids in a single phase.

Currently, a need exists for a downhole gas and solids separator that simultaneously separates gases and solids from a hydrocarbon production stream. A separator device is needed that prevents both gaseous products and solid products from entering pumps and reducing the efficiency of pumps. Further, a device is needed that lowers costs by reducing the need to repair or replace downhole assembly parts.

In view of the foregoing, it is apparent that a need exists in the art for a gas and solids separator which overcomes, mitigates or solves the above problems in the art. It is a purpose of this invention to fulfill this and other needs in the art which will become more apparent to the skilled artisan once given the following disclosure.

OBJECTS AND SUMMARY OF THE INVENTION

It is an object of the present invention to overcome the above described drawbacks associated with current devices. To achieve these and other advantages and in accordance with the purpose of the invention, as embodied and broadly described, the present disclosure describes a downhole gas and solids separator which employs centrifugal force for the downhole separation of gases and solids from a hydrocarbon production stream.

In all production, gases, sand and other solids enter the wellbore and create pumping inefficiencies that severely diminish production and contribute to increased maintenance costs and unnecessary failures. The disclosed device is a simple, effective separator that uses centrifugal force and an internal flighting member for effective downhole separation of both gases and solids from production fluid. The disclosed device allows clean and gas-free production fluid to fill the pump intake permitting greater production and pump efficiency.

The disclosed separator device generally comprises an outer tube; an inner tube disposed within the outer tube; an outer annular space inside the outer tube, wherein the outer annular space defines an annular void space between the exterior surface of the inner tube and the interior surface of the outer tube; and a flighting member disposed within the inner tube, wherein the flighting member includes an inside diameter space that defines a cylindrical void space extending through the center portion of the flighting member. By utilizing a helical flighting member, the disclosed device is able to provide for efficient and effective simultaneous separation of both gases and solids from production fluid.

The unique and novel configuration of the disclosed separator device provides many advantages over current separator devices. Unlike existing separator devices, the primary advantage of the disclosed device is that it provides for the simultaneous separation of both gases and solids from a hydrocarbon production stream. The disclosed device employs a helical flighting member for effective downhole separation of both gases and solids from production fluid. Centrifugal force, provided by the flighting member, accelerates the coalescence of like materials to enhance separation of both gases and solids within the separator. Centrifugal force urges solids to the outer wall of the inner tube and urges gases towards the center of the inner tube where passageways (i.e., void spaces) are designed to allow solids to efficiently migrate toward and accumulate at the bottom of the separator device, while simultaneously allowing gases to efficiently rise out of the separator device.

In this manner, the disclosed device effectively cleans production fluid and prevents gaseous products and solid products from entering a pump, thereby improving the efficiency of the pump. By moving less gaseous products and solid products through the artificial lift system, oil and gas operators will benefit from greater pump efficiency and extended run times between failures, and the operators will thereby increase their profit margin.

A further advantage provided by the disclosed device is that in one embodiment of the disclosed invention, the device comprises components which all have threaded connections to provide for easy disassembly, inspection, repair or replacement, and reassembly of each of the components of the device. In comparison, current separators are typically made of components which are fixed together and thus the entire separator device must be disposed of when any component of the separator is damaged or in need of repair.

These, together with other objects of the invention, along with various features of novelty that characterize the invention, are pointed out with particularity in the claims annexed hereto and forming a part of this disclosure. For a better understanding of the invention, its operating advantages, and the specific objects attained by its uses, reference should be had to the accompanying drawings and descriptive matter in which there is described illustrative embodiments of the invention.

BRIEF DESCRIPTION OF THE DRAWINGS

The accompanying drawings, which are incorporated in and form a part of the specification, illustrate embodiments of the present invention, and together with the description, serve to explain the principles of the invention. It is to be expressly understood that the drawings are for the purpose of illustration and description only and are not intended as a definition of the limits of the invention. In the drawings.

DETAILED DESCRIPTION OF ILLUSTRATIVE EMBODIMENTS

Figure 1:
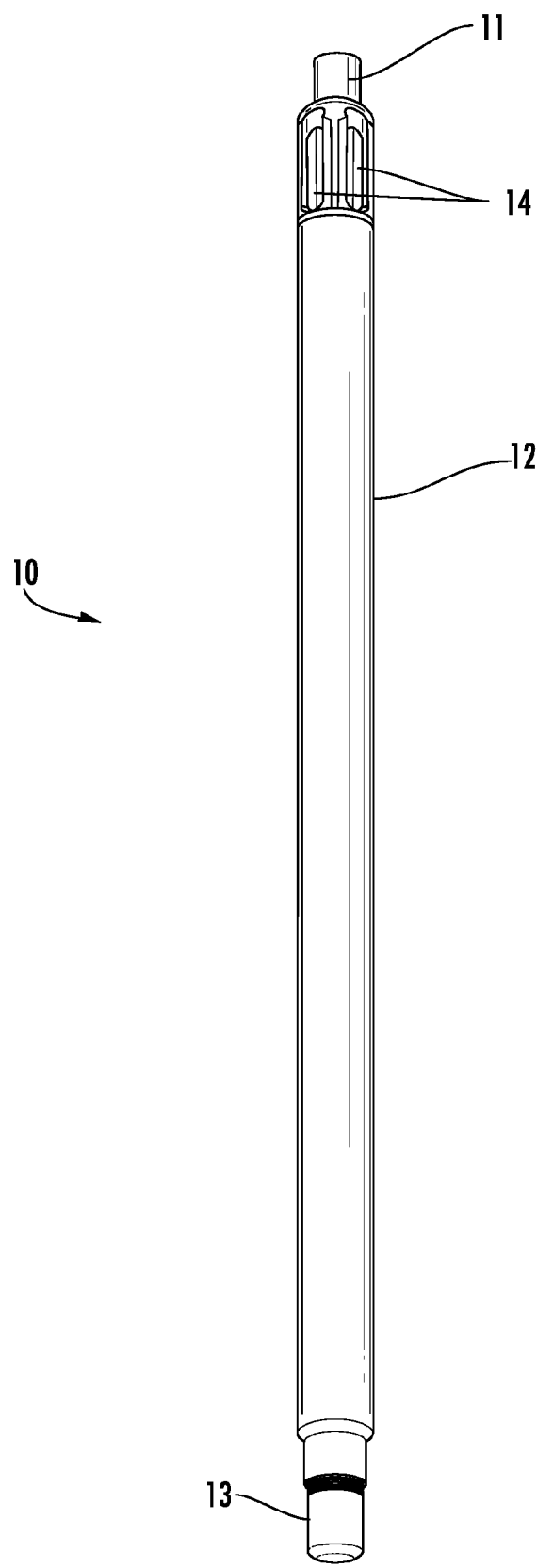
FIG. 1 is a perspective view of a separator device constructed in accordance with the teachings of the present disclosure.

Referring now to FIGS. 1-11, exemplary embodiments of a separator device 10 in accordance with the present disclosure are illustrated. The separator device 10 according to the present disclosure generally includes an outer tube 12; an inner tube 18 disposed within the outer tube 12; an outer annular space 19 inside the outer tube 12, wherein the outer annular space 19 defines an annular void space formed between the exterior surface of the inner tube 18 and the interior surface of the outer tube 12; and a flighting member 20 disposed within the inner tube 18, wherein the flighting member 20 includes an inside diameter space 16 that defines a cylindrical void space extending through the center portion of the flighting member 20.

Figure 8:
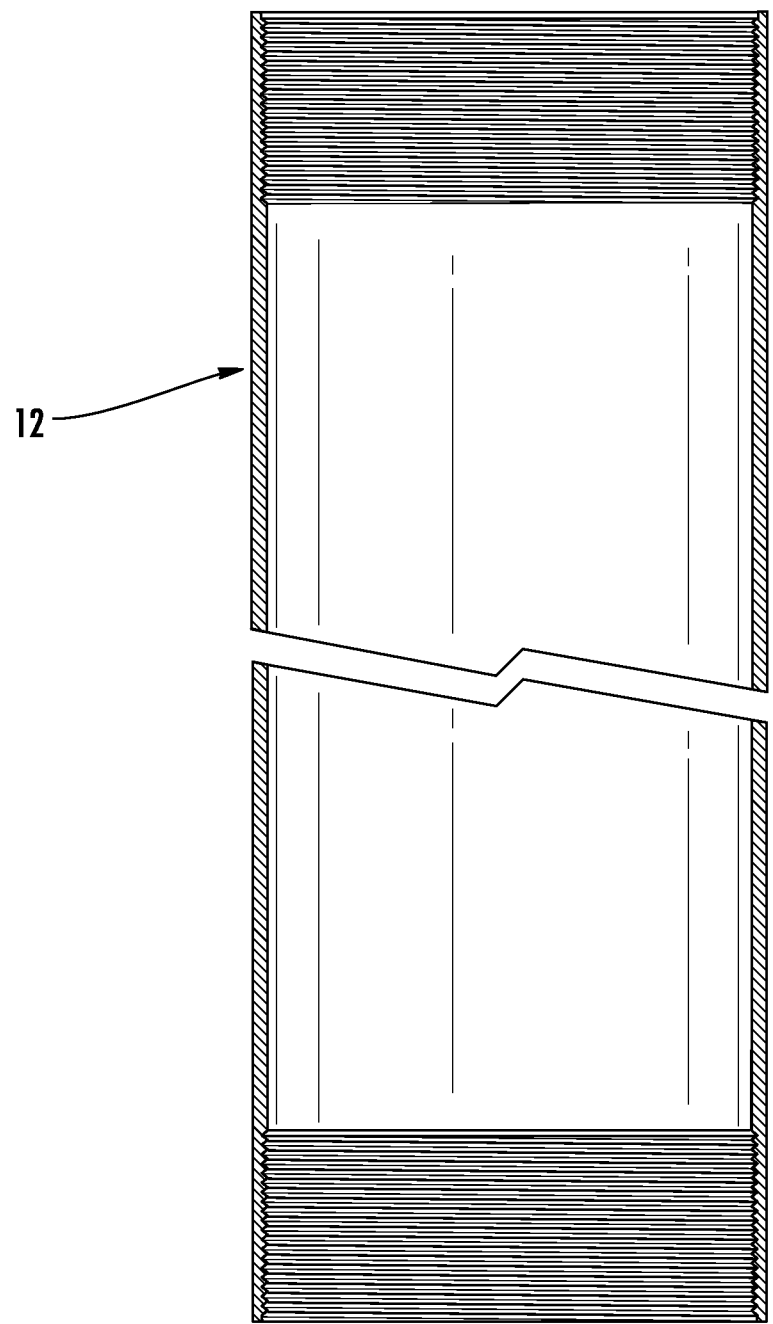
FIG. 8 is a side sectional view of an outer tube constructed in accordance with the teachings of the present disclosure.

As depicted in FIGS. 1 and 8, the outer tube 12 may define a long unperforated pipe. The outer tube 12 includes a first end, a second end, an interior surface and an exterior surface. The first end and the second end of the outer tube 12 may define threaded ends for attaching the first end to a gas discharge member 11 and for attaching the second end to a plug member 13, as illustrated in FIG. 1. The outer tube 12 may be attached to a gas discharge member 11 via a threaded connection or by any other attachment means known to those skilled in the art. Likewise, the outer tube 12 may be attached to a plug member 13 via a threaded connection or by any other attachment means known to those skilled in the art.

Figure 7:
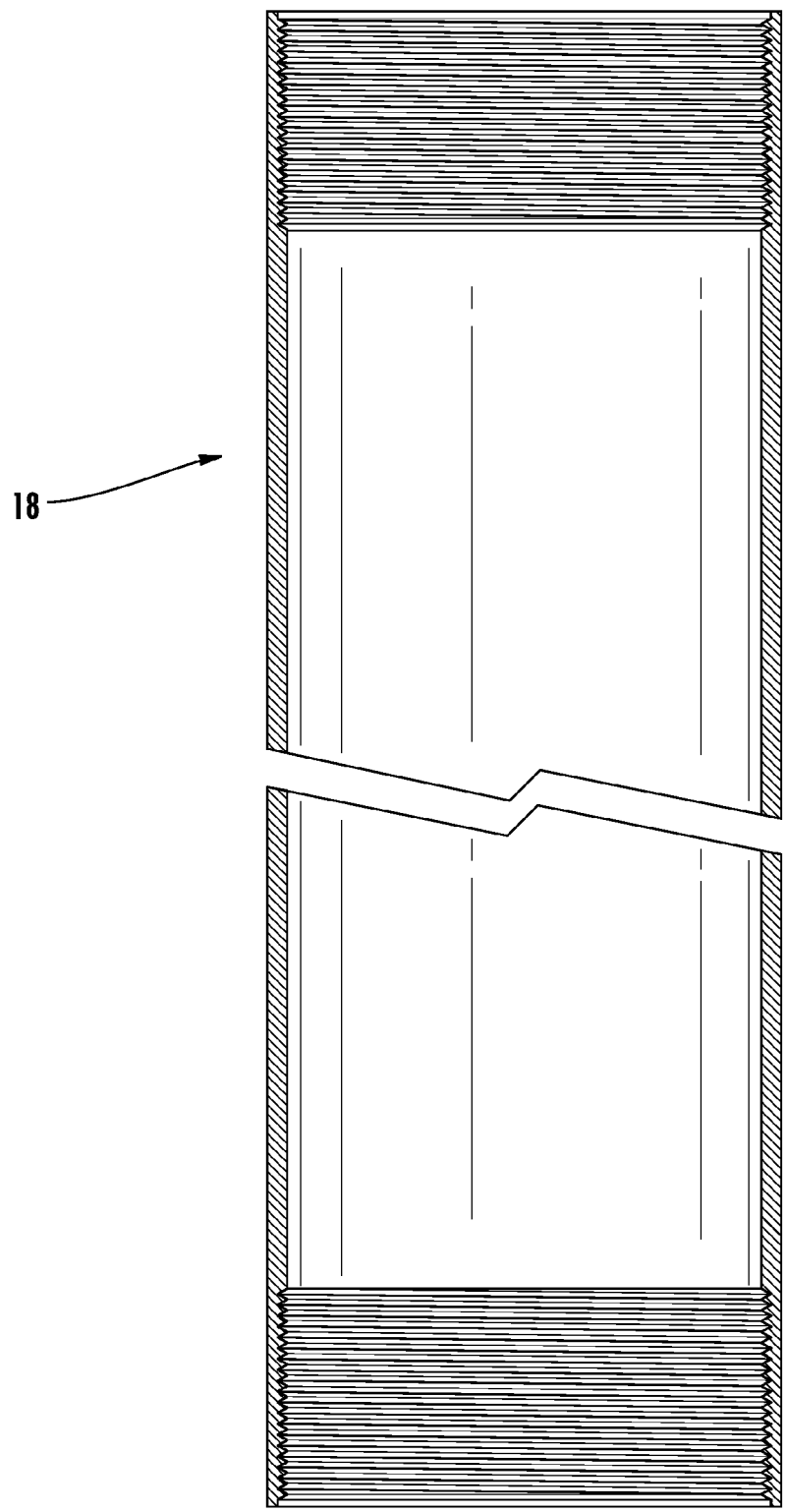
FIG. 7 is a side sectional view of an inner tube constructed in accordance with the teachings of the present disclosure.

As shown in the accompanying Figures, the disclosed separator device 10 further includes an inner tube 18 disposed within the outer tube 12. The inner tube 18 includes a first end, a second end, an interior surface and an exterior surface. As depicted in FIG. 7, the first end and the second end of the inner tube 18 may define threaded ends for attaching the first end to an inner tube adapter or to a gas discharge member 11 and for attaching the second end to a base member 22. The inner tube 18 may be coupled to both the inner tube adapter 15 and the base member 22 via threaded connections or any other attachment means known to those skilled in the art.

Figure 2:
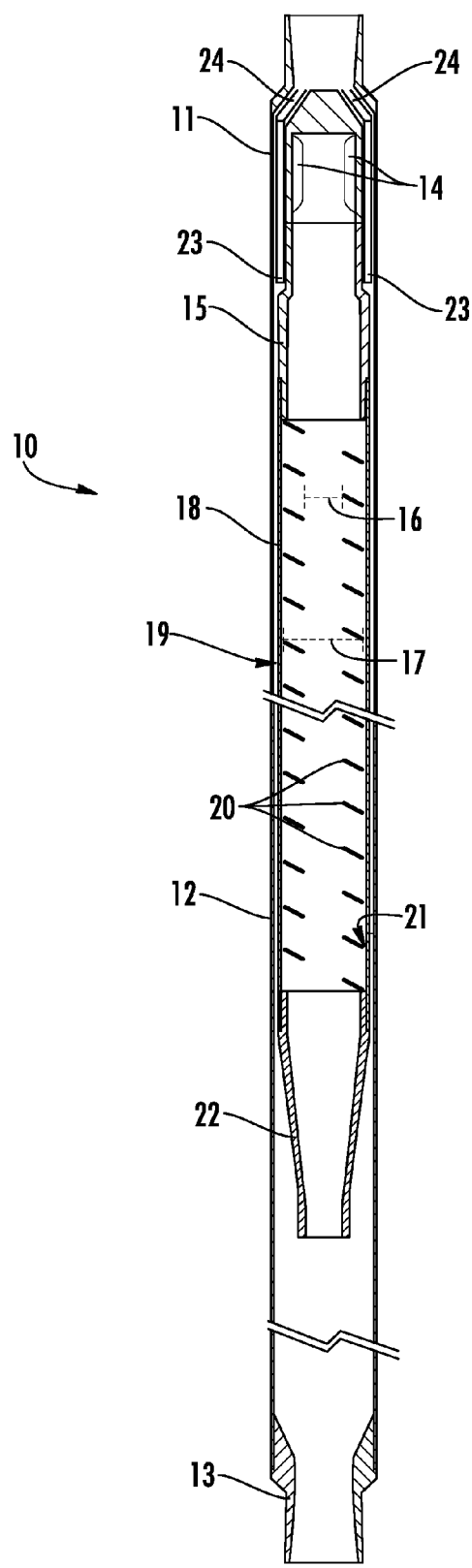
FIG. 2 is a sectional view showing the internal structure of a separator device constructed in accordance with the teachings of the present disclosure.
Figure 3:
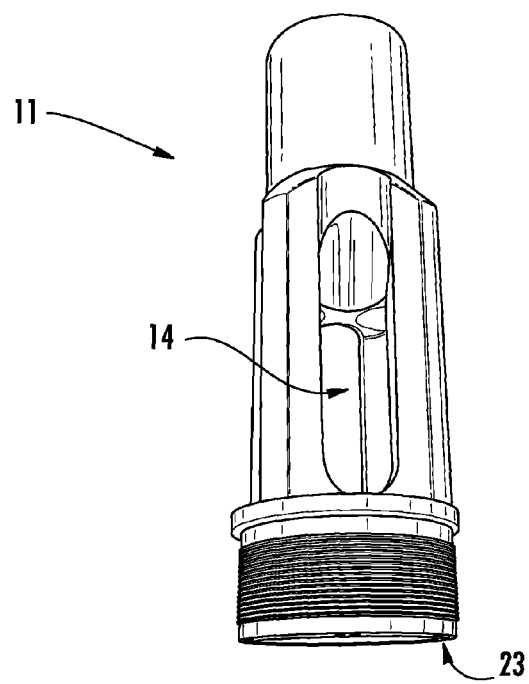
FIG. 3 is a perspective view of a gas discharge member constructed in accordance with the teachings of the present disclosure.
Figure 4:
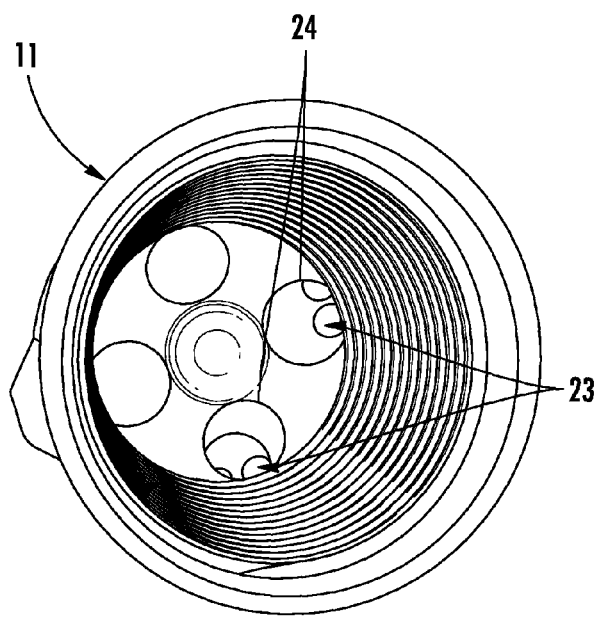
FIG. 4 is a top perspective view of the gas discharge member shown in FIG. 3.
Figure 5:
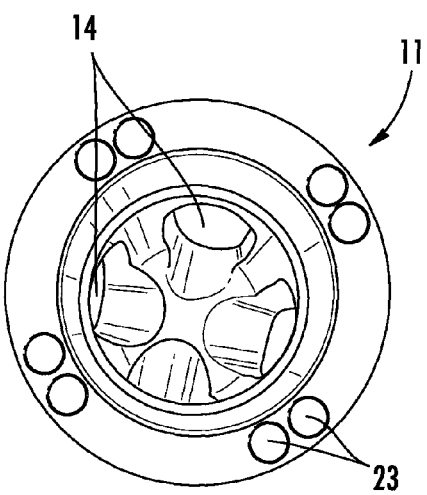
FIG. 5 is a bottom perspective view of the gas discharge member shown in FIG. 3.
Figure 6:
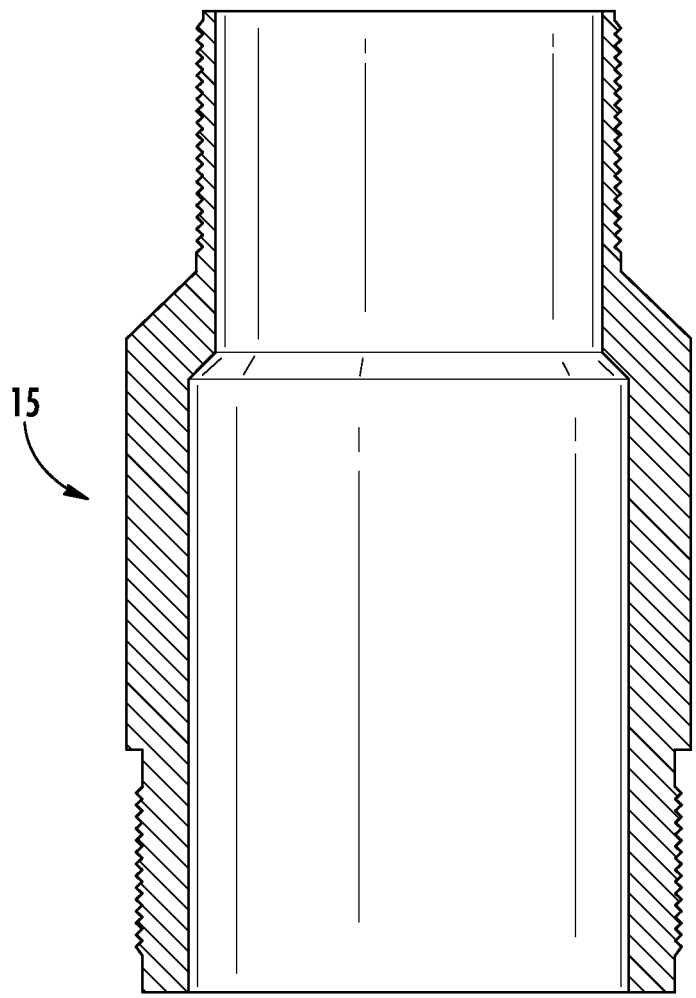
FIG. 6 is a side sectional view of an inner tube adapter constructed in accordance with the teachings of the present disclosure.

Turning to FIG. 2, the disclosed separator further includes an outer annular space 19 inside the outer tube 12. The outer annular space 19 defines an annular-shaped void space between the exterior surface of the inner tube 18 and the interior surface of the outer tube 12. In operation, after fluid from a hydrocarbon production stream has been separated from gases and solids, an artificial lift system pulls the fluid backup through the outer annular space 19.

The disclosed separator device 10 also includes a flighting member 20. In the embodiments shown in FIGS. 2 and 11, the flighting member 20 is a helical member which is disposed inside the inner tube 18. The flighting member 20 has a first end, a second end, an inside diameter space 16 and an outside diameter 17. The inside diameter space 16 of the flighting member 20 defines a cylindrical void space extending through the center portion of the flighting member 20. The inside diameter space 16 is configured to provide a large unobstructed pathway for gas bubbles to easily exit the separator device 10.

In the embodiment depicted in FIG. 2, the flighting member 20 is disposed inside the inner tube 18 between a base member 22 and an inner tube adapter 15. In this embodiment, the flighting member 20 is not fixed to the inner tube 18, to the base member 22, or to the inner tube adapter 15. Rather the base member 22 is attached to the second end of the inner tube 18 and the second end of the flighting member 20 sits on top of the base member 22. An inner annular space 21 separates the outermost edges of the flighting member 20 from the interior surface of the inner tube 18. This inner annular space 21 defines the void space extending from the outside diameter 17 of the flighting member 20 to the interior surface of the inner tube 18.

In one embodiment contemplated by the present disclosure, the disclosed separator further includes a gas discharge member 11. The gas discharge member 11 includes openings 14 that are arranged and configured to allow the fluid production stream to enter the separator device 10. In the embodiments illustrated in the attached figures, the openings 14 are configured as elongated slots. In alternative embodiments, the openings 14 may be configured as narrow slots or as alternative shapes which may be designed to prevent large gas bubbles from entering the separator through the openings 14. One skilled in the art can appreciate that there are many other possibilities that exist for the shape, configuration, positioning, and number of the openings 14, all of which are considered to be within the spirit and scope of the present invention.

The gas discharge member 11 further includes one or more apertures 23 and 24 defining passageways through one or more walls of the gas discharge member 11. These apertures 23 and 24 are arranged and configured to receive fluid from the hydrocarbon production stream after it has been separated from gases and solids. After the artificial lift system draws fluid up through the outer annular space, 19 the fluid is then drawn up through the apertures 23 and 24 formed through the walls of the gas discharge member 11, allowing the clean fluid to flow out of the device 10 and into a pump.

As illustrated in FIG. 2, the gas discharge member 11 may be attached to an inner tube adapter 15, which inner tube adapter 15 is attached to the first end of the inner tube 18. The inner tube adapter 15 may be attached to both the gas discharge member 11 and the inner tube 18 via threaded connections or any other connection means known to those skilled in the art. Additionally, the gas discharge member 11 may be attached to the first end of the outer tube 12, as shown in FIGS. 1 and 2. The gas discharge member 11 may be attached to the outer tube 12 via a threaded connection or any other connection means known to those skilled in the art.

Figure 9:
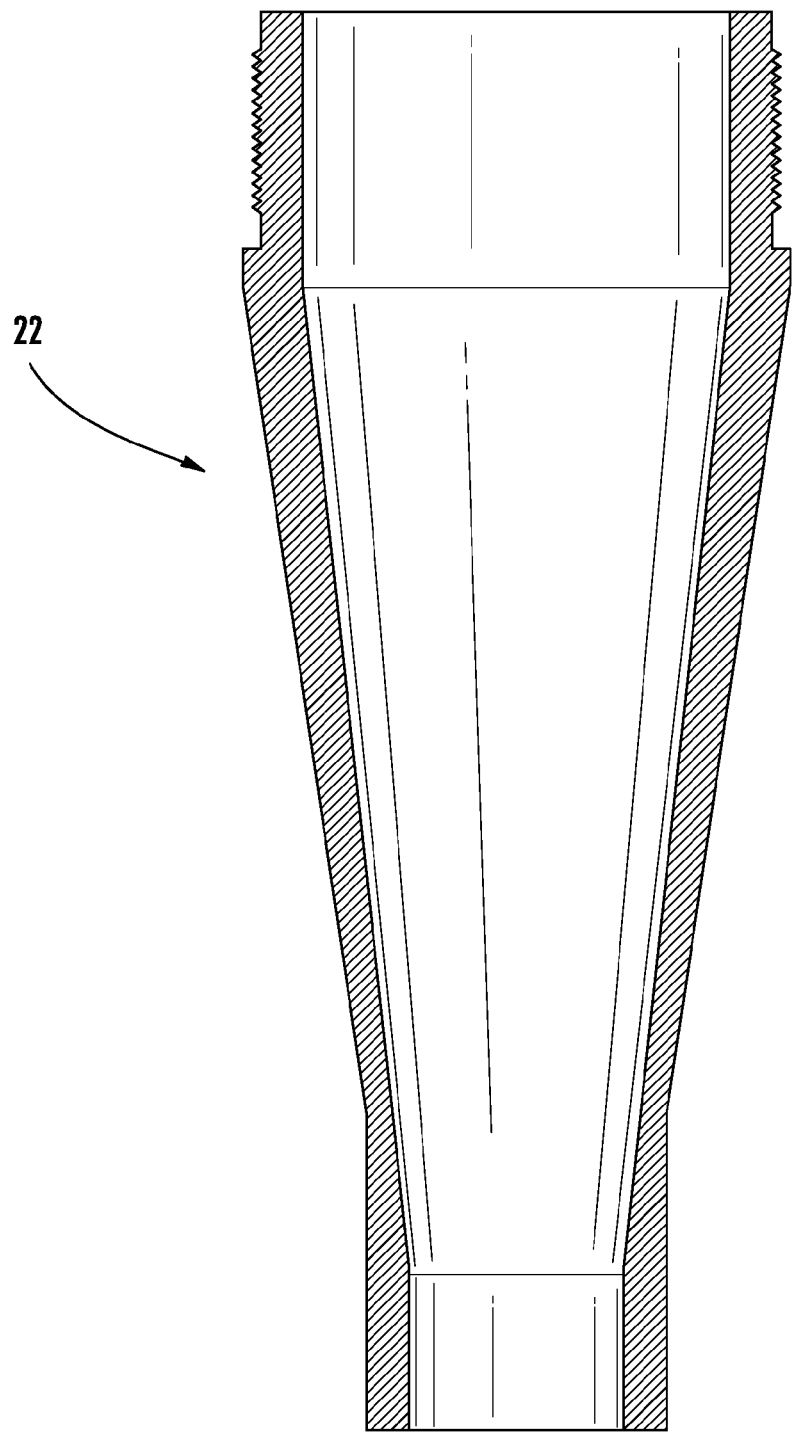
FIG. 9 is a side sectional view of a base member constructed in accordance with the teachings of the present disclosure.

Turning to FIG. 9, the disclosed separator may further include a base member 22 attached to the second end of the inner tube 18. As depicted in FIG. 9, the base member 22 may be cone-shaped for receiving and funneling solid products to the center of the device 10 where the solids will continue to fall downwardly by gravity and accumulate in a solids accumulation area. The solids accumulation area defines an empty chamber for receiving solid products separated from the production fluid by the disclosed separator device 10. The solids accumulation area is located below the inner tube 18 and flighting member 20 and below the base member 22. The solids accumulation area may be located above a closed plug member 13 or a closed mud anchor joint extension (not depicted) located below the plug member 13.

Figure 10:
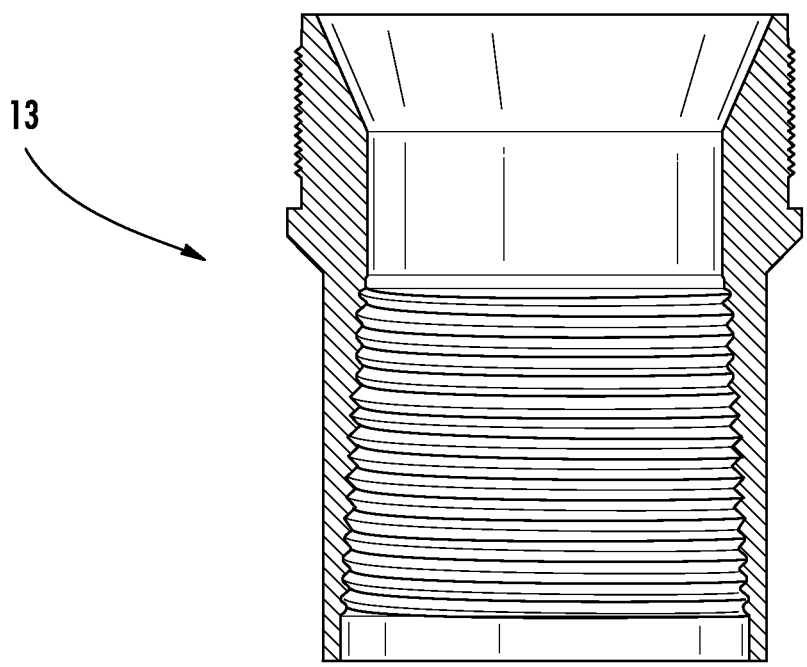
FIG. 10 is a side sectional view of a plug member constructed in accordance with the teachings of the present disclosure.
Figure 11:
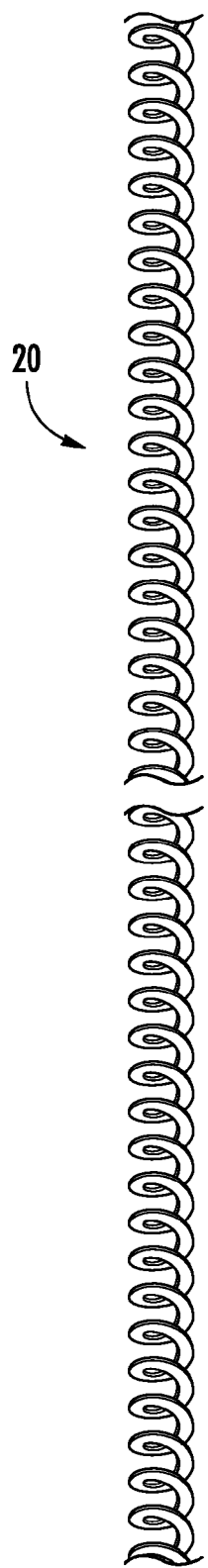
FIG. 11 is a side perspective view of a flighting member constructed in accordance with the teachings of the present disclosure.

As depicted in FIGS. 1, 2 and 10, the disclosed separator device 10 may further include a plug member 13 attached to the second end of the outer tube 12. The plug member 13 is easily removable from the device 10 and can be removed from the device 10 to empty the accumulated solids from the solids accumulation area.

In operation, the disclosed separator device 10 may work as follows. The production stream is drawn into the one or more openings 14 in the gas discharge member 11 by both the artificial lift system and gravity. Once the production stream enters through the openings 14 in the gas discharge member 11, the production stream is drawn down through the inner tube adapter 15 into the inner tube 18 where the production stream is drawn down a helical path provided by the flighting member 20 disposed within the inner tube 18. Centrifugal force is generated when the production stream flows down the helical path provided by the flighting member 20. Centrifugal force urges the heavier components (e.g., the solids) in the production stream outwards toward the interior surface of the inner tube 18 into the inner annular space 21. The solid products eventually migrate down the inner annular space 21 until the solids are captured in a solids accumulation area located below the base member 22 attached to the second end of the inner tube 18. At the same time, the centrifugal force provided by the helical flighting member 20 forces the lighter components (e.g., the gases) in the production stream inwards toward the inside diameter space 16 of the flighting member 20. The inside diameter space 16 of the flighting member 20 is a cylindrical void space extending through the center of the flighting member 20. Here, gas bubbles move to the center of the inner tube 18 and coalesce into larger gas bubbles. The enlarged gas bubbles then rise through the inside diameter space 16 extending through the center of the inner tube 18. The enlarged gas bubbles continue to rise through the inside diameter space 16 until the gas bubbles exit through the openings 14 in the gas discharge member 11. Once the gas exits through the openings 14 in the gas discharge member 11, the gas exits into the well casing annulus and then continues rising to the surface of the well. Finally, once the production stream has been separated from gases and solids, the artificial lift system draws the production stream back up the device 10 through the outer annular space 19 located between the exterior wall of the inner tube 18 and the interior wall of the outer tube 12. One or more apertures 23 and 24 formed through the wall of the gas discharge member 11 form pathways for the production stream to flow out of the device 10 and into a pump. The pump (not depicted) is located above the separator device 10. In this manner, the disclosed device 10 effectively cleans production fluid and prevents gaseous products and solid products from entering the artificial lift system.

It is important to note that the construction and arrangement of the elements of the device provided herein are illustrative only. Although only a few exemplary embodiments of the present invention have been described in detail in this disclosure, those skilled in the art who review this disclosure will readily appreciate that many modifications are possible in these embodiments (such as variations in orientation of the components of the system, sizes, structures, shapes and proportions of the various components, etc.) without materially departing from the novel teachings and advantages of the invention.

Many other uses of the present invention will become obvious to one skilled in the art upon acquiring a thorough understanding of the present invention. Once given the above disclosures, many other features, modifications and variations will become apparent to the skilled artisan in view of the teachings set forth herein. Such other uses, features, modifications and variations are, therefore, considered to be a part of this invention, the scope of which is to be determined by the following claims.

The invention claimed is:

1. A separator device for use with a hydrocarbon production well producing a fluid production stream including gaseous products and solid products, said separator device comprising:
   an outer tube including a first end, a second end, an interior surface, and an exterior surface;

a gas discharge member attached to the first end of the outer tube;

an inner tube disposed within said outer tube, said inner tube including a first end, a second end, an interior surface, and an exterior surface;

an outer annular space inside said outer tube, wherein said outer annular space defines an annular void space between the exterior surface of said inner tube and the interior surface of said outer tube; and a helical flighting member disposed within said inner tube, said flighting member including a first end, a second end, an inside diameter space, and an outside diameter, wherein said inside diameter space defines a cylindrical void space extending through the center portion of said flighting member, wherein the helical flighting member sits on top of a base member and remains unattached to the inner tube and wherein the helical flighting member generates centrifugal force when said productions stream flows along said flighting member.

2. The device according to claim 1, wherein said gas discharge member includes one or more openings arranged and configured to allow the fluid production stream to enter the separator device through the said one or more openings and flow downwardly into the inner tube.

3. The device according to claim 2, wherein said gaseous products exit said device through said one or more openings in said gas discharge member.

4. The device according to claim 1, wherein said gas discharge member includes one or more apertures defining passageways within one or more walls of the gas discharge member.

5. The device according to claim 4, wherein said one or more apertures receive fluid from the fluid production stream after said fluid has been separated from the gaseous products and the solid products.

6. The device according to claim 1, further including an inner tube adapter, wherein said inner tube adapter is attached to the first end of said inner tube and said inner tube adapter is attached to said gas discharge member.

7. The device according to claim 1, wherein the base member is attached to the second end of said inner tube and an inner tube adapter is attached to said first end of said inner tube, wherein said flighting member is disposed inside said inner tube between said base member and said inner tube adapter.

8. The device according to claim 7, wherein said flighting member sits on top of said base member in a manner in which said flighting member remains detached from said base member, from said inner tube, and from said inner tube adapter.

9. The device according to claim 1, further comprising an inner annular space defining a void space extending from the outside diameter of said flighting member to the interior surface of said inner tube.

10. The device according to claim 9, wherein said flighting member generates centrifugal force when said fluid production stream flows down said flighting member, thereby simultaneously urging said solid products into said inner annular space of said inner tube and said gaseous products into said inside diameter space of said flighting member.

11. The device according to claim 1, further comprising a cone-shaped base member attached to the second end of said inner tube.

12. The device according to claim 11, wherein said base member funnels the solid products separated from said fluid production stream into a solids accumulation area.

13. The device according to claim 1, further comprising a plug member attached to the second end of said outer tube, wherein said plug member is removable from said device in order to empty the solid products from the device after the solid products are separated from the fluid production stream.

14. The device according to claim 1, wherein said inside diameter space is devoid of any structure extending therethrough.

15. The device according to claim 1, wherein said gas discharge member includes one or more apertures defining vertically extending apertures formed within said one or more walls of said gas discharge member.

16. The device according to claim 2, wherein said one or more openings in said gas discharge member define holes formed through one or more walls of said gas discharge member.

17. A separator device for use with a hydrocarbon production well producing a fluid production stream including gaseous products and solid products, said separator device comprising:

an outer tube including a first end, a second end, an interior surface, and an exterior surface;

an inner tube disposed within said outer tube, said inner tube including a first end, a second end, an interior surface, and an exterior surface;

an outer annular space inside said outer tube, wherein said outer annular space defines an annular void space between the exterior surface of said inner tube and the interior surface of said outer tube;

a flighting member disposed within said inner tube, said flighting member including a first end, a second end, an inside diameter space, and an outside diameter, wherein said inside diameter space defines a cylindrical void space extending through the center portion of said flighting member;

an inner annular space inside said inner tube, wherein said inner annular space defines an inner annular void space extending from the outside diameter of said flighting member to the interior surface of said inner tube; and a gas discharge member attached to the first end of said outer tube, wherein said gas discharge member includes one or more openings arranged and configured to allow the fluid production stream to enter the separator device through the openings and flow downwardly into the inner tube, and wherein said gas discharge member includes one or more apertures defining passageways through one or more walls of the gas discharge member, said one or more apertures being arranged and configured to receive fluid from the fluid production stream after said fluid has been separated from the gaseous products and the solid products.

18. A method of separating gaseous products and solid products from a fluid production stream of a hydrocarbon production well using the separator device according to claim 17, said method comprising the follow steps:

drawing said fluid production stream into said one or more openings in said gas discharge member;

drawing said fluid production stream into said inner tube down a helical path provided by said flighting member disposed within said inner tube;

generating centrifugal force as said fluid production stream flows down said helical path provided by said flighting member, wherein said centrifugal force urges said solid products into said inner annular space and urges said gaseous products into said inside diameter space;

capturing said solid products in a solids accumulation area located below said inner tube;

allowing said gaseous products to exit said device through said one or more openings in said gas discharge member;

using an artificial lift system to draw the fluid production stream up said device through said outer annular space;

drawing the fluid production stream out of said device through said one or more apertures defining passageways through one or more walls of the gas discharge member.

19. A separator device for use with a hydrocarbon production well producing a fluid production stream including gaseous products and solid products, said separator device comprising:

an outer tube including a first end, a second end, an interior surface, and an exterior surface;

a gas discharge member attached to the first end of the outer tube;

an inner tube disposed within said outer tube, said inner tube including a first end, a second end, an interior surface, and an exterior surface;

a base member attached to the second end of said inner tube;

an inner tube adapter attached to said first end of said inner tube;

an outer annular space inside said outer tube, wherein said outer annular space defines an annular void space between the exterior surface of said inner tube and the interior surface of said outer tube; and a flighting member disposed within said inner tube, said flighting member including a first end, a second end, an inside diameter space, and an outside diameter, wherein said inside diameter space defines a cylindrical void space extending through the center portion of said flighting member;

wherein said flighting member sits on top of said base member in a manner in which said flighting member remains detached from said base member, from said inner tube, and from said inner tube adapter, wherein the helical flighting member generates centrifugal force when said productions stream flows along said flighting member.

* * * * *